(12) United States Patent　　　　(10) Patent No.:　US 12,679,757 B2
Mior Hassan et al.　　　　　　　　(45) Date of Patent:　　Jul. 14, 2026

(54) HOLDING JIG WITH BALANCING MECHANISM

(71) Applicant: TELEFLEX MEDICAL LLC, Morrisville, NC (US)

(72) Inventors: Mior Uzair Bin Mior Hassan, Kamunting (MY); Jegajothi Singanayagam, Kamunting (MY)

(73) Assignee: TELEFLEX MEDICAL LLC, Morrisville, NC (US)

( * ) Notice: Subject to any disclaimer, the term of this patent is extended or adjusted under 35 U.S.C. 154(b) by 37 days.

(21) Appl. No.: 18/421,278

(22) Filed: Jan. 24, 2024

(65) Prior Publication Data

US 2024/0228357 A1　　　Jul. 11, 2024

Related U.S. Application Data

(63) Continuation of application No. PCT/US2022/074038, filed on Jul. 22, 2022.

(60) Provisional application No. 63/225,628, filed on Jul. 26, 2021.

(51) Int. Cl.
　　*C03B 23/09*　　　　(2006.01)
(52) U.S. Cl.
　　CPC ................................... *C03B 23/09* (2013.01)
(58) Field of Classification Search
　　CPC ... C03B 23/092; A61M 2207/10; B29C 57/00
　　See application file for complete search history.

(56) References Cited

U.S. PATENT DOCUMENTS

| | | | |
|---|---|---|---|
| 5,102,324 A | 4/1992 | Bullard et al. | |
| 5,360,330 A | * 11/1994 | Jensen | B29C 57/00 |
| | | | 264/491 |
| 6,216,493 B1 | * 4/2001 | Weston | A61M 5/30 |
| | | | 65/68 |
| 6,640,587 B1 | * 11/2003 | Hollesen | C03B 23/097 |
| | | | 425/402 |

(Continued)

FOREIGN PATENT DOCUMENTS

| | | | |
|---|---|---|---|
| CN | 205520516 U | 8/2016 | |
| CN | 115364320 A | * 11/2022 | ............ A61M 39/12 |
| JP | 57196731 A | * 5/1981 | |

OTHER PUBLICATIONS

Notification of Allowance in CN Application No. 202280057400.9, mailed Jun. 1, 2026.

(Continued)

*Primary Examiner* — Erin Snelting
(74) *Attorney, Agent, or Firm* — Baker Hostetler

(57)　　　　　　ABSTRACT

A holding jig for a glass former and a method for shaping an end of a breathing tube are described. The holding jig includes a glass former having an interior shaping cavity for receiving the end of the breathing tube. The holding jig also includes a floating balance plate that abuts the glass former. A base plate has a seat recess for receiving the balance plate, and a tube hole for receiving the breathing tube. A grip plate is releasably secured to the base plate, and includes a grip hole sized to receive a portion of the glass former. An adjustment plug is used to selectively position the balance plate within the seat recess to align a longitudinal axis of the glass former with a longitudinal axis of the tube hole of the base plate.

20 Claims, 5 Drawing Sheets

(56) References Cited

U.S. PATENT DOCUMENTS

| | | |
|---|---|---|
| 2005/0235996 A1 | 10/2005 | Hooser et al. |
| 2010/0319708 A1 | 12/2010 | Mahr et al. |
| 2014/0261460 A1 | 9/2014 | Tseng et al. |
| 2015/0122264 A1 | 5/2015 | Donlon et al. |
| 2015/0306327 A1 | 10/2015 | Persson |

OTHER PUBLICATIONS

"Glass & Metal Tip Forming Moulds", Soebygaard Machine Design, Retrieved from https://soebygaard.com/wp-content/uploads/2020/03/GF-MF-Tip-forming-moulds.pdf, Retrieved on Oct. 2022, 2 Pages.

So et al., "Flexible, tapered-tip tube facilitates conventional orotracheal intubation by novice intubators", Feb. 2006, Journal of Anesthesia, vol. 20(4): 344-7.

* cited by examiner

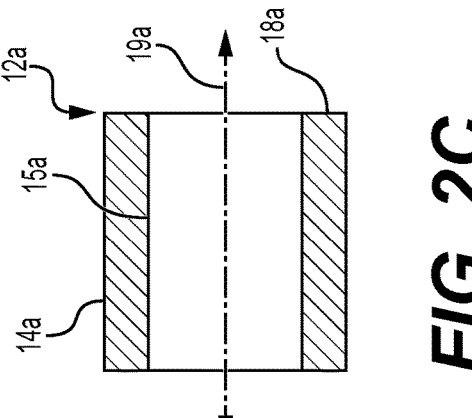
*FIG. 2C*
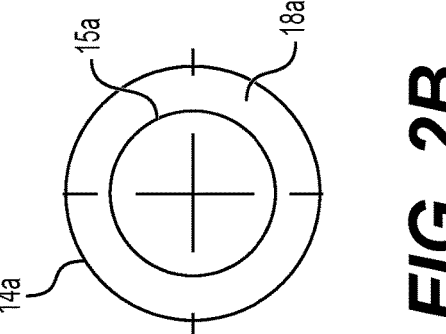
*FIG. 2B*
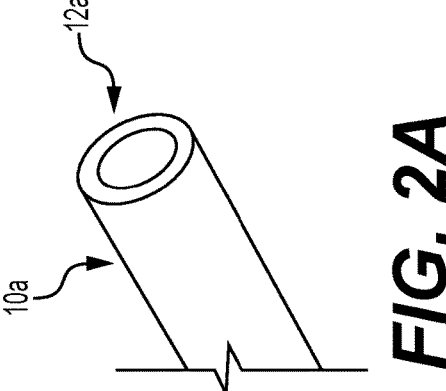
*FIG. 2A*
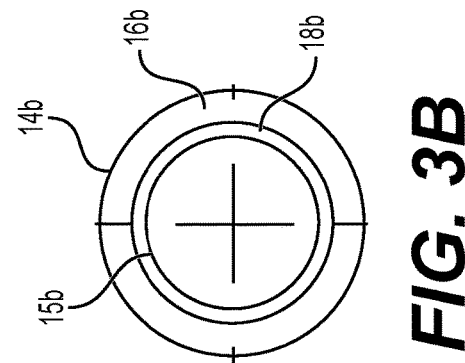
*FIG. 3C*
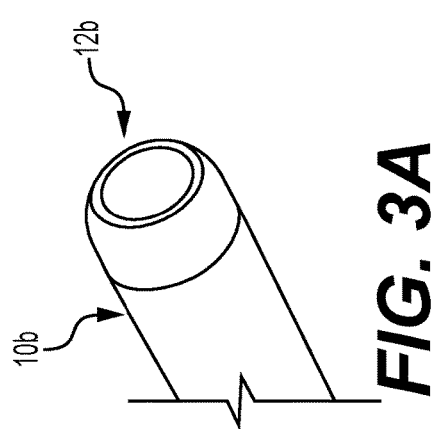
*FIG. 3B*
*FIG. 3A*

HOLDING JIG WITH BALANCING MECHANISM

CROSS-REFERENCE TO RELATED APPLICATIONS

The present application is a continuation of International Patent Application No. PCT/US2022/074038, filed Jul. 22, 2022, which claims the benefit of priority to U.S. Provisional Patent Application No. 63/225,628, filed Jul. 26, 2021, the contents of which are incorporated herein by reference in their entireties.

FIELD OF THE INVENTION

The present invention generally relates to a holding jig for a glass former and a method of forming an end of a breathing tube.

BACKGROUND

Conventional clamping mechanisms are commonly used to secure a mold during the manufacturing process when shaping various types of breathing tubes, such as tracheostomy tubes or endotracheal tubes, among others. Typical clamping mechanisms may include a stationary platen fixed to a base frame of a molding machine. The stationary platen may be coupled to a movable platen by tie bars which act as a linear guide for guiding the movable platen relative to a base plate. Such movable platens are oftentimes movable along the linear guide between the stationary platen and the base plate via a drive source operable to control opening, closing, and clamping the mold.

For instance, when an injection molding material is injected into a corresponding mold to form a molded product, the mold is clamped into a secure position by the mold clamping mechanism. To ensure proper formation of the molded product, the stationary and movable platens are uniformly clamped throughout the surface of the mold. To attain this uniformity, corresponding surfaces of the stationary and movable platens are required to be parallel to each other. This ensures a uniform distribution of clamping forces on the mold, which further ensures high molding accuracy. Moreover, for conventional clamping mechanisms which have a stationary platen fixed on a base frame, the stationary platen cannot be reoriented with respect to a movable platen to ensure they remain parallel with each other.

Other conventional mold clamping mechanisms may include a stationary platen that is slidable with respect to a base frame without being fixed to it. This type of clamping mechanism may include a linear guide for guiding a movable platen to an extended position so that it can also guide relative movement of the stationary platen. This arrangement allows the stationary platen to be uniformly secured against the mold while remaining parallel to the movable platen. In another known arrangement, a stationary platen may be configured to slide on a base frame so that its upper and lower ends can be freely and uniformly deformed by the clamping force.

In yet another known arrangement, a stationary platen may be mounted on a base frame by a mounting member for movement with respect to the base frame. The lower part of the stationary platen is thus allowed to move with respect to the base frame via shock absorbing means, such as a spring, provided on the mounting member. As a result, the stationary platen can be prevented from being bent as the clamping force is generated. Such conventional clamping mechanisms are intended to prevent, or equalize, bending of the stationary platen as the clamping force is applied.

While such conventional holding jigs are able to grip a glass former firmly, surface variations in the glass former disadvantageously cause deviations in the perpendicularity of the shape of the breathing tube formed during the shaping process. These deviations in the glass former generally appear as variations in its outer dimensions due to the nature of the blow molding process used to produce the glass former. This is because blow molding processes generally lack precision control. Moreover, since breathing tubes are typically made from plastic, such as polyvinyl chloride (PVC), the process of shaping their tips with great precision via a glass former is often very challenging. This is because a fully formed tip must be smooth and shaped to be perpendicular between the longitudinal axis of the tube body and the distal tip surface. In order to satisfy these requirements, several sets of holding jigs are needed to account for the different variations of each glass former.

Further, the surface variance on the glass former also affects the outer diameter of the glass former, which can cause damage to other components of the holding jig when assembled to due to their incompatibility. This can result in the need to use numerous replacement jigs. Moreover, spare parts for the jigs are often needed to perform maintenance resulting from these wear and tear issues. Preventing or limiting malformation of the tip of the breathing tube correspondingly prevents disruptions of the production line, time consuming rework, and wasting of scrap material.

Accordingly, there is a clear and substantial need for a new and improved holding jig for a glass former used in the process of shaping an end of a breathing tube. The holding jig of the present invention solves the above mentioned problems by securely gripping a glass former and maintaining the perpendicularity of the of the glass former relative to the jig base despite uneven surface variations of the glass former.

SUMMARY

The foregoing needs are met, to a great extent, by the present invention of a holding jig for shaping an end of a breathing tube. The holding jig comprises a glass former including a proximal end, a distal end, and an interior shaping cavity configured to receive the end of the breathing tube; a balance plate including a distal balance surface configured to abut the proximal end of the glass former; a base plate including a proximal base surface, a distal base surface defining a seat recess configured to receive the balance plate, and a tube hole configured to receive the breathing tube; a grip plate configured to be releasably secured to the base plate, the grip plate including a grip hole sized to receive a portion of the glass former; and an adjustment plug operable to selectively position the balance plate within the seat recess to align a longitudinal axis of the glass former with a longitudinal axis of the tube hole of the base plate.

According to another aspect of the present invention, the proximal end of the base plate includes a plug hole configured to receive the adjustment plug.

According to another aspect of the present invention, the plug hole opens to an interior space of the seat recess of the base plate to permit moving the adjustment plug into the seat recess to abut a proximal balance surface of the balance plate.

According to another aspect of the present invention, the adjustment plug is configured to prevent removal of the adjustment plug from the plug hole.

According to another aspect of the present invention, the flexible arm includes a flared wing configured to prevent removal of the adjustment plug from the plug hole.

According to another aspect of the present invention, the proximal end of the base plate includes four plug holes annularly spaced apart for respectively receiving four adjustment plugs.

According to another aspect of the present invention, the base plate includes a fastener hole extending through the base plate and configured to receive a fastener for releasably securing the base plate to the grip plate.

According to another aspect of the present invention, the grip plate further comprises a lock hole corresponding to the fastener hole of the base plate, the lock hole configured to receive the fastener for releasably securing the base plate to the grip plate.

According to another aspect of the present invention, the grip plate includes a proximal grip surface configured to abut the distal base surface of the base plate when receiving the glass former within the grip hole.

According to another aspect of the present invention, the grip hole has a sloped inner surface configured to grip a sloped outer surface of the glass former.

According to another aspect of the present invention, a diameter of the grip hole of the grip plate is equal to a maximum diameter of the glass former.

According to another aspect of the present invention, the longitudinal axis of the glass former extends in a direction between the proximal end of the glass former and the distal end of the glass former.

According to another aspect of the present invention, the interior shaping cavity of the glass former defines an inner surface configured to shape the outer surface of the distal end of the tube when the glass former is heated.

According to another aspect of the present invention, the diameter of the interior shaping cavity decreases in size in a direction from the proximal end of the glass former toward the distal end of the glass former.

According to another aspect of the present invention, the distal end of the glass former is closed and includes an elongated core protruding into the shaping cavity along the longitudinal axis of the glass former.

According to another aspect of the present invention, the proximal end of the glass former includes a seating surface having an outwardly extending annular flange configured to stabilize glass former against the distal balance surface of the balance plate.

According to another aspect of the present invention, the balance plate comprises acetal resin.

According to another aspect of the present invention, the breathing tube is a tracheostomy tube.

According to another aspect of the present invention, the breathing tube is an endotracheal tube.

According to another aspect of the present invention, a method of shaping an end of a breathing tube comprises providing a holding jig; inserting the end of the breathing tube into the shaping cavity of the glass former; manipulating the adjustment plug to position the balance plate of the holding jig within the seat recess of the base plate and to orient glass former in a desired position; and heating the glass former for a set period of time such that an outer surface of the distal end of the breathing tube is shaped corresponding to the inner surface of the glass former and the tip surface of the shaped breathing tube is substantially perpendicular to the longitudinal axis of the tube body.

There has thus been outlined certain embodiments of the present invention in order that the detailed description thereof herein may be better understood, and in order that the present contribution to the art may be better appreciated. There are additional embodiments of the present invention that will be described below and which form the subject matter of the claims appended hereto.

In this respect, before explaining at least one aspect of the holding jig in detail, it is to be understood that the holding jig is not limited in its application to the details of construction and to the arrangements of the components set forth in the following description or illustrated in the drawings. The holding jig is capable of aspects in addition to those described, and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this invention is based may readily be utilized as a basis for the designing of other structures, methods, and systems for carrying out the several purposes of the holding jig. It is important, therefore, that the claims be regarded as including such equivalent constructions insofar as they do not depart from the spirit and scope of the invention.

BRIEF DESCRIPTION OF THE DRAWINGS

In order that the present invention may be readily understood, aspects of the holding jig of the present invention are illustrated by way of examples in the accompanying drawings, in which like parts are referred to with like reference numerals throughout.

FIG. 2A illustrates a perspective view of an example of a breathing tube prior to shaping its distal end.

FIG. 2B illustrates a front view of the breathing tube of FIG. 2A.

FIG. 2C illustrates a side cross-sectional view of the breathing tube of FIG. 2A.

FIG. 3A illustrates a perspective view of an example of a breathing tube after shaping its distal end.

FIG. 3B illustrates a front view of the breathing tube of FIG. 3A.

FIG. 3C illustrates a side cross-sectional view of the breathing tube of FIG. 3A

DETAILED DESCRIPTION

The present invention is directed to a holding jig for a glass former and a method of using the holding jig to shape an end of a breathing tube, such as a tracheostomy tube or an endotracheal tube, among other types of tubes. A typical tracheostomy tube, for instance, is a curved tube that is inserted into a hole made in the neck and trachea of a patient.

This hole is also known as a tracheostomy stoma and replaces a person's nose and mouth as the main pathways for breathing. A tracheostomy tube is inserted into the stoma to keep the hole open and provide an entryway for air into the lungs. A tracheostomy may be performed to provide an airway in people who need to be on a mechanical ventilator or who have trouble swallowing and are at risk for aspiration of the lungs. A tracheostomy is also commonly done when a patient is unable cough up their own mucus since it provides an easy way to suction mucus from the lungs.

A typical tracheostomy tube includes an outer cannula that acts as the main body of the tube and includes a flange or neck plate extending from the sides of the outer cannula for accommodating a tie or strap that wraps around the patient's neck. In some implementations, an optional inner cannula may be provided which fits inside the outer cannula and acts as a liner that can be removed and cleaned to help prevent the build-up of mucus inside the tracheostomy tube. The inner cannula can lock into place to prevent accidental removal from the outer cannula. An obturator may also be used to facilitate insertion of the tracheostomy tube into a desired position within the trachea. The obturator fits inside the tracheostomy tube to provide a smooth surface that guides the tube during insertion through the stoma and into the trachea. The obturator is removed once the distal end of the tracheostomy tube is placed in the trachea.

Figure 1:
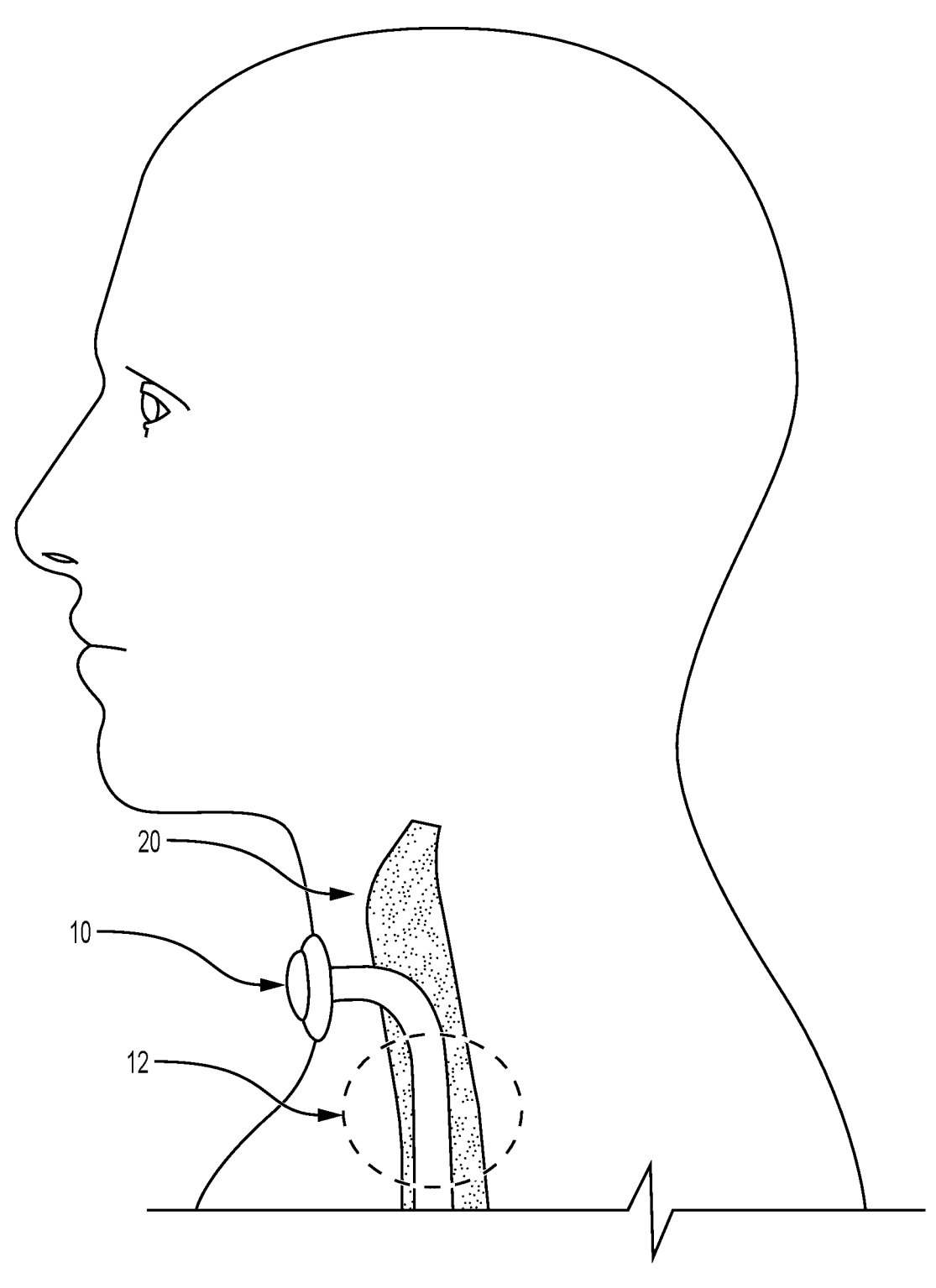
FIG. 1 illustrates a conventional tracheostomy tube inserted in a patient's trachea.

FIG. 1 depicts an example of a breathing tube 10 having a distal end 12 inserted into a patient's trachea 20 to provide an airway passage for breathing. A glass former is commonly used to form or shape the distal end of the breathing tube to facilitate insertion of the tube into the trachea. In particular, the distal end 12 of the breathing tube 10 is shaped to include an outer surface having a tapered or rounded portion to allow for smooth insertion of the breathing tube into the trachea while preventing or limiting irritation and trauma to the patient. Additionally, the tip surface at the distal end of the breathing tube is shaped to be substantially perpendicular to a longitudinal axis of the breathing tube in order to ensure uniformity of the adjacent tapered portion. While the breathing tube 10 example depicted in FIG. 1 is a tracheostomy tube, various other types of breathing tubes, such as an endotracheal tube, may similarly be shaped using the glass former holding jig according to the present invention.

FIGS. 2A-2C show an example of a breathing tube 10a prior to shaping its distal end 12a via a glass former. The breathing tube 10a is made from a plastic material, such as polyvinyl chloride (PVC). The breathing tube 10a has a cylindrical shape and includes an outer surface 14a having a first diameter and an inner surface 15a having a second diameter, where the first diameter is larger than the second diameter. For ideal conditions, the first diameter is constant along the length of the tube at the distal end 12a, and the second diameter is constant along the length of the tube at the distal end 12a. For other conditions, however, the first and second diameters may not be constant along the length of the tube. The distal end 12a of the tube 10a has a tip surface 18a that is substantially perpendicular to a longitudinal axis 19a of the tube body.

FIGS. 3A-3C show an example of a breathing tube 10b after shaping its distal end 12b using the holding jig of the present invention. The shaped breathing tube 10b includes an outer surface 14b having a first diameter and an inner surface 15b having a second diameter, where the first diameter is larger than the second diameter. The outer surface 14b includes a tapered portion 16b at the shaped distal end 12b of the tube, in which the first diameter decreases in a direction toward a tip surface 18b. The inner surface 15b has a constant diameter along the length of the tube at the shaped distal end 12b. The tip surface 18b of the shaped distal end 12b of the tube is substantially perpendicular to the longitudinal axis 19b of the tube body.

The holding jig of the present invention is configured to firmly grip the glass former while undergoing the process of heating the glass former when shaping the distal end of the breathing tube. The blow molding process used to manufacture glass formers generally lacks precision, and therefore can often lead to dimensional and surface variations of the resulting glass former. These dimensional and surface variations of the glass former pose a significant challenge when shaping the distal end of the breathing tube. For instance, such variations in the glass former may result in the tip surface of the tube not being shaped perpendicular with the longitudinal axis of the tube body—but rather being shaped such that the tip surface is slanted relative to the longitudinal axis of the tube.

Variations in the glass former may also prevent the tapered distal end of the tube from being fully formed. Other defects due to the variations in the glass former may include rough patches or bubbles formed on the distal end of the tube, among other types of deformations. Additionally, the glass former surface variance can also cause damage to conventional holding jigs due to discrepancies with the size and/or circularity of the jig's lock plate. This can lead to increased maintenance and/or replacement of jig parts due to the resulting frequent wear and tear. The holding jig of the present invention solves these problems by ensuring that an axis of the diameter of the glass former remains perpendicular to a base surface of the holding jig. This is accomplished by a balancing mechanism configured to grip the glass former to maintain the desired perpendicularity with the holding jig despite deviations or unevenness in the surface of the glass former.

Figure 4:
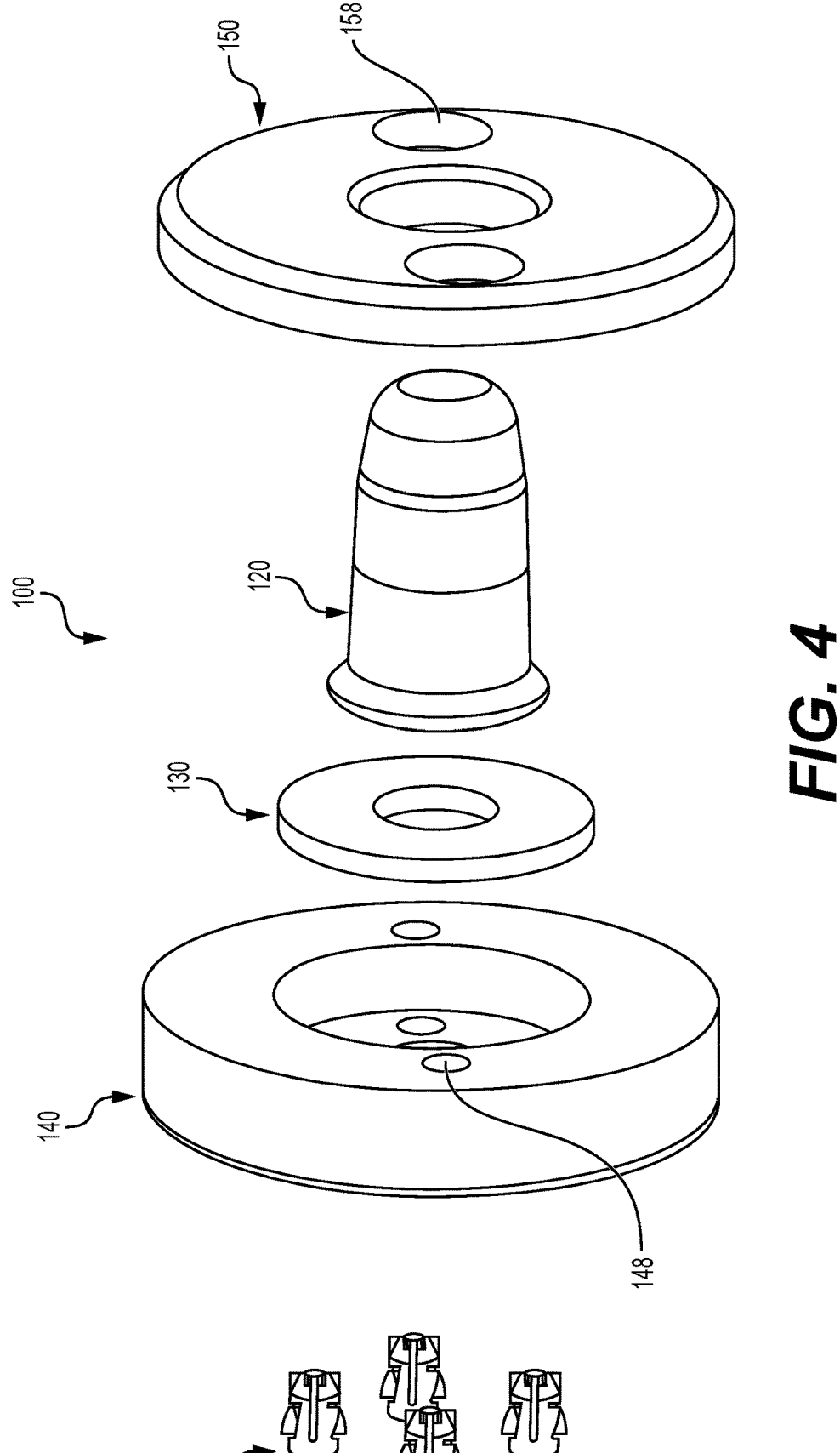
FIG. 4 illustrates an exploded perspective view of a holding jig according to an implementation of the present invention.
Figure 5:
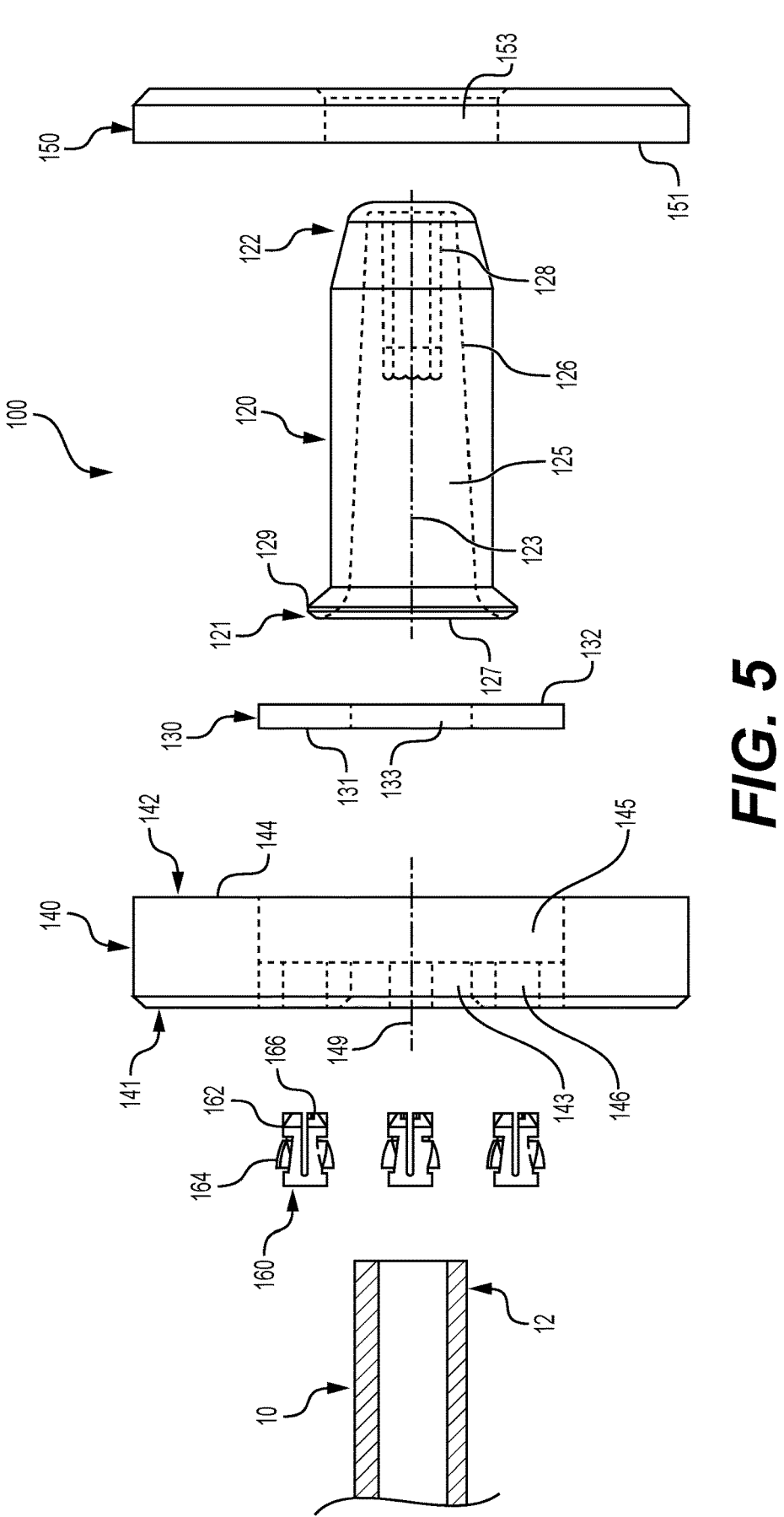
FIG. 5 illustrates a cross-sectional side view of the holding jig of the present invention.

FIGS. 4 and 5 illustrate a holding jig 100 according to the present invention for shaping the end of the breathing tube. The holding jig 100 comprises a glass former 120, a balance plate 130 for orienting a position of the glass former, a base plate 140 configured to receive the balance plate, and a grip plate 150 configured to releasably secure to the base plate.

The glass former 120 includes a proximal end 121, a distal end 122, and a longitudinal axis 123 extending in a direction from the proximal end to the distal end. The glass former 120 includes an interior shaping cavity 125 defining an inner surface 126 configured to shape the outer surface of the distal end of the tube when the glass former is heated. The proximal end 121 of the glass former includes a seating surface 129 and an opening 127 configured to receive the distal end 12 of the breathing tube 10 so that the distal end of the tube may be inserted into the shaping cavity 125. The diameter of the interior shaping cavity 125 decreases in size in a direction from the proximal end 121 toward the distal end 122. For instance, such a narrowing diameter of the interior cavity 125 of the glass former correspondingly forms a tapered outer surface of the distal end 12 of the tube 10 when the glass former is heated. Accordingly, this decrease in diameter size corresponds to the tapered profile of the tube for easy release of the tube from the holding jig after the shaping process is completed. The distal end 122 of the glass former is closed and includes an elongated core 128 protruding into the shaping cavity 125 along the longitudinal axis 123.

During setup for a tube shaping process, a user first assembles the glass former 120 with the holding jig 100. The user then secures the glass former in position by pushing one or more adjustment plugs 160 against the balance plate 130 until the glass former attains firm positioning and perpendicularity relative to the tube, as will be discussed in further detail below. The user may then perform a tube shaping test in order to gauge whether any readjustment of the position of the glass former is needed.

During a tube shaping process, the core 128 is received within the distal end 12 of the tube to help maintain the position of the tube as the inner surface 126 of the glass former correspondingly shapes the outer surface of the distal end 12 of the tube 10 as the glass former is heated. As a result, the shape of the outer surface of the distal end of the tube becomes tapered while the shape of the inner surface of the distal end of the tube remains unchanged. Thus, the core 128 also helps the inner surface of the distal end of the tube maintain a constant diameter, which is the same diameter extending through the rest of the tube body. According to some aspects, the glass former 120 with the holding jig 100 are heated for a set period of time at a heating platform. The heated glass former may then be subsequently transferred to a shaping platform where the shaping of the tube takes place without a continuous supply of heat. Thus, only heat stored in the glass former is used to shape the tube.

The balance plate 130 includes a proximal balancing surface 131 and a distal balancing surface 132. The distal balancing surface 132 is configured to abut the seating surface 129 at the proximal end 121 of the glass former 120. More particularly, the seating surface 129 at the proximal end 121 of the glass former may include an outwardly extending annular flange to increase stability of the glass former against the distal balancing surface 132 of the balance plate 130. The balance plate 130 also includes a through-hole 133 sized to receive the breathing tube 10. The balance plate 130 is moveable and the distal balancing surface 132 acts as a complimentary seating surface for the seating surface 129 of the glass former. Since the balance plate 130 is a separate part from the main holding jig body (i.e., the base 140 plate and the grip plate 150), the balance plate is able to be easily removed and replaced instead of replacing the entire holding jig assembly when performing maintenance on the holding jig due to damage or deformation caused from wear and tear. Furthermore, the balance plate may be custom machined to match a profile corresponding with an alternative glass former surface variation.

The base plate 140 includes a proximal base end 141 and a distal base end 142. The base plate 140 also includes a tube hole 143 having a longitudinal axis 149, the tube hole 143 being configured to receive the breathing tube 10. The tube hole 143 is also configured to ensure the perpendicularity of the tube relative to the base plate 140 when the glass former and the holding jig grip the tube at both the core 128 and the hole 143, respectively. The distal base end 142 includes a distal base surface 144 circumferentially surrounding a seat recess 145. The seat recess 145 is configured to receive the balance plate 130, such that the through-hole 133 of the balance plate 130 substantially aligns with the tube hole 143 of the base plate 140 when the balance plate is in an initial position. In some aspects, a depth of the seat recess 145 may be approximately equal to 0.5 mm plus the sum of the thickness of the balance plate 130 and the thickness of the flanged seat surface 129 of the glass former. Such a depth of the seat recess ensures it is able to receive both the balance plate and a portion of the glass former.

The proximal end 141 of the base plate 140 includes a plug hole 146 that opens to an interior space of the seat recess 145. The plug hole 146 is configured to receive an adjustment plug 160 for selectively adjusting a position of the balance plate 130 when the balance plate is received within the seat recess 145. In some implementations, a plurality of plug holes 146 are provided to respectively receive a corresponding plurality of adjustment plugs 160. For instance, four plug holes may be provided to respectively receive four corresponding adjustment plugs. In such an example, each of the plurality of plug holes 146 may be annularly spaced apart by an equal distance, such as by ninety degrees. Thus, in this arrangement, two plug holes may be effectively positioned along and spaced apart on the x-axis of a plane of the base plate, and the remaining two plug holes may be effectively positioned along and spaced apart on the y-axis of the plane of the base plate. According to some aspects, the plug hole may be a threaded hole having size M4×0.5 in order to equip the holding jig with fine adjustment thread motion of 0.5 mm per pitch.

The proximal end 141 of the base plate further includes a fastener hole 148 radially spaced apart from the plug hole 146. The fastener hole 148 extends through the base plate to the distal base surface 144 and may be threaded to receive a threaded fastener, such as an M5 screw, for releasably securing the base plate to the grip plate 150. In some aspects, two or more fastener holes 148 may be provided in the base plate 140 and spaced apart from each other. For instance, as shown in FIG. 4, a pair of fastener holes 148 are spaced apart on opposite sides of the base plate along the x-axis of the plane of the base plate.

The grip plate 150 includes a grip hole 153 sized to receive a portion of the glass former. The grip plate 150 also includes a proximal grip surface 151 configured to abut the distal base surface 142 of the base plate to grip or trap the glass 120 former therebetween. A lock hole 158 in the grip plate corresponds to the respective fastener hole 148 of the base plate 140 and may be threaded to allow the threaded fastener to releasably secure the base plate to the grip plate. The grip hole 153 may be sloped or tapered to ensure a tight grip on the glass former. According to some aspects, a minimum diameter of the grip hole may be equal to a maximum diameter of the body of the glass former in order to prevent excessive pressure and friction from being applied to the glass former. This helps to prevent glass former from cracking and breaking, and also prevents unintended deviations in the perpendicularity of the glass former relative to the grip plate and the base plate when the glass former is secured therebetween.

Each of the plurality of adjustment plugs 160 is operable to selectively position the balancing plate 130 within the seat recess 145 of the base plate 140 to align the longitudinal axis 123 of the glass former with the longitudinal axis 149 of the tube hole 143 of the base plate. Since the plug hole 146 of the base plate is open to the seat recess 145, each adjustment plug 160 is able to be moved into the seat recess in order to abut the proximal balance surface 131 of the balance plate 130. Thus, each adjustment plug secures the balance plate 130 in a floating position within the seat recess 145 of the base plate 140, such that the locked floating position corresponds to a desired orientation of the glass former resulting in sufficient perpendicularity of the shape of the tip surface at the distal end of the tube upon heating the glass former, as will be discussed in further detail below.

Each adjustment plug 160 further includes a lock mechanism that enables balancing adjustment during set up in order to allow for quick and easy adjustment to the position of the balance plate 130 within the seat recess 145. For instance, each adjustment plug 160 includes a proximal end having a flexible arm 162 extending therefrom to allow for easy insertion into a corresponding plug hole 146 of the base plate. In some instances, a plurality of flexible arms may be provided. For example, each adjustment plug 160 may include four flexible arms.

The adjustment plug is configured to ensure one-way directional adjustment so that the obtained position and orientation of the balance plate within the seat recess remains fixed. For instance, the adjustment plug 160 may be configured to be irreversibly inserted into the corresponding plug hole 146 of the base plate. In particular, each flexible arm 162 may include a flared wing 164 to prevent removal of the adjustment plug from the plug hole 146. In some aspects, removal of the adjustment plug from the plug hole may be accomplished by squeezing each flexible arm inwardly to create enough clearance between the flared wing and the diameter of the plug hole so that the adjustment plug can be pulled out of the base plate.

In operation, surface variances of the seating surface 129 of the glass former 120 can affect the perpendicularity of the seating surface with respect to its longitudinal axis 123, which results in corresponding deviations in the perpendicularity of the tip surface of the breathing tube 10 during the tube shaping process. This is because such non-perpendicularity of the seating surface 129 prevents the longitudinal axis 123 of the glass former from aligning with the longitudinal axis 149 of the tube hole 143 of the base plate when the grip plate 150 is tightly secured to the base plate. According to some aspects, the relative flatness of the seating surface 129 of the glass former may vary by ±0.5 mm. Moreover, surface variations on the outer surface of the glass former may also prevent the longitudinal axis 123 of the glass former from aligning with the longitudinal axis 149 of the tube hole 143 of the base plate. In some instances, the relative griping area ovality of the glass former may vary by ±0.2 mm.

To solve this problem, the balance plate 130 is located within the seat recess 145 of the base plate 140 and is pressed between the adjustment plug 160 and the seating surface 129 at the proximal end 121 of the glass former 120. A user is then able to rotate or push one or more of the adjustment plugs into a corresponding plug hole 146 of the base plate so that a tip end 166 of the respective adjustment plug pushes on the proximal surface 131 of the balance plate. The user is therefore able to correspondingly move the balance plate 130 by shifting or tilting its orientation relative to the base plate 140 until the distal surface 132 of the balance plate abuts the seating surface 129 at the proximal end of the glass former. Thus, the user is able to adjust any of the adjustment plugs 160 to selectively position or orient the balance plate and the glass former such that and the longitudinal axis 123 of the glass former substantially aligns with the longitudinal axis 149 of the base plate in order to ensure the tip surface of the breathing tube 10 is shaped perpendicular to the longitudinal axis of the tube body. Stated another way, the balance plate is pushed by one or more of the adjustment plugs until the glass former is fixed in a desired position relative to the base plate. In some aspects, each adjustment plug 160 is configured to enable adjustment of the balance plate by ±0.5 mm per pitch.

Figure 6:
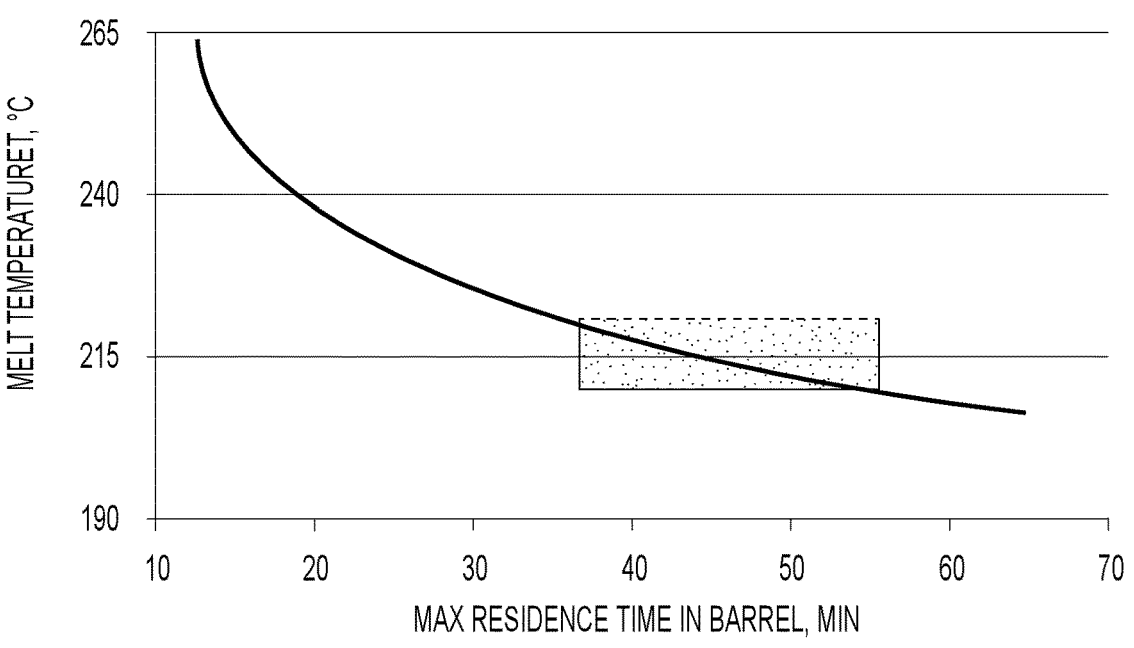
FIG. 6 is a diagram depicting a melting temperature of acetal resin versus the maximum residence time in a barrel.
Figure 7:
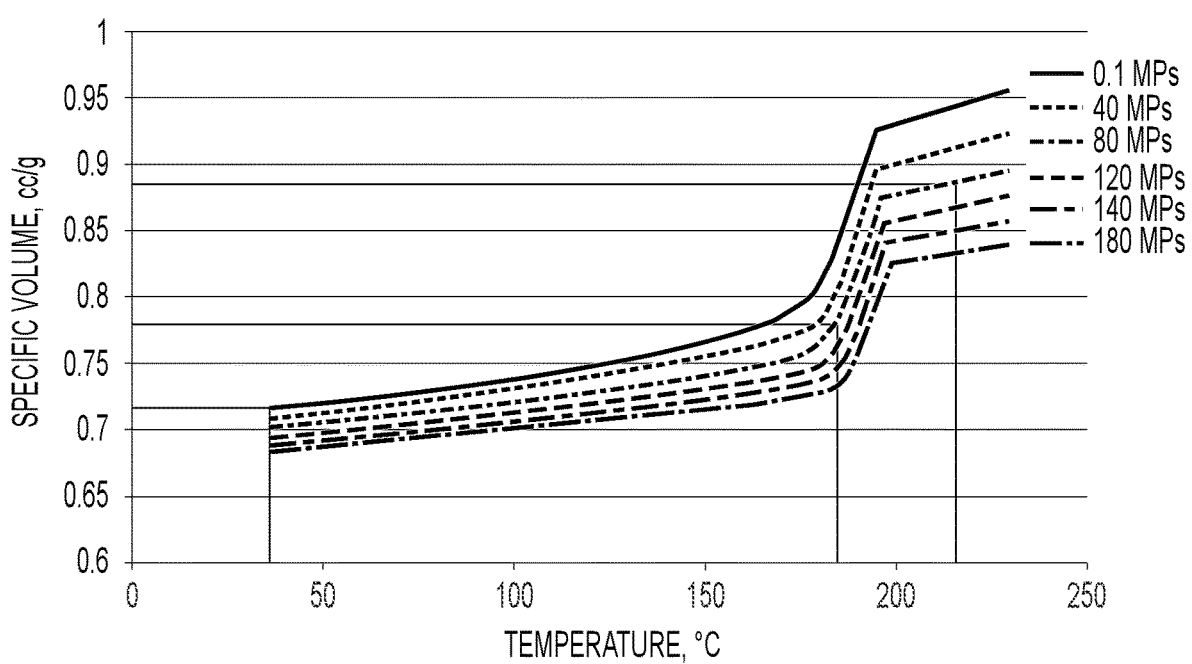
FIG. 7 is a PVT diagram of acetal resin.

Thus, once the glass former is secured between the base plate and the grip plate, the user is able to move the balance plate via the one or more adjustment plugs to lock the glass former in a desired orientation in which its longitudinal axis substantially aligns with the longitudinal axis of the tube hole of the base plate. Heat is then applied to the glass former at approximately 380±10° C. for twenty seconds. For example, when the heater setting is approximately 390° C., a brass heater block temperature is approximately 150° C.

and the glass former temperature is approximately 100° C. In some implementations, the base plate, the grip plate, and the balance plate are each made from a high-performance acetal resin, such as Delrin which has a melting point of 175° C. Acetal resin such as Delrin also has high stiffness and excellent dimensional stability. Accordingly, the balance plate, base plate, and grip plate are able to withstand the forming temperature of the glass former during the tube shaping process. Referring to FIG. 6, the melting temperature of Delrin versus the maximum residence time in the barrel is illustrated. Further, turning to FIG. 7, a PVT diagram of Delrin acetal resin having a melt density of 1.17 g/cc (0.85 cc/g) and a solid density of 1.42 g/cc (0.70 cc/g) is illustrated Prior to heating the glass former during a tube shaping process using the holding jig 100 of the present invention, the unshaped breathing tube 10 is first inserted through the tube hole 143 in the base plate until the distal end 12 of the tube is seated firmly into the shaping cavity 125 of the glass former, such that the core 128 is received within the distal end of the tube. As the glass former is headed, heat transfer from the glass former to the tube allows the outer surface of the distal end of the tube to be shaped corresponding to the shape of the inner surface 126 of the glass former, thus resulting in the tapered portion at the distal end of the tube. The tip surface of the tube retains its optimal perpendicularity with respect to the longitudinal axis of the tube body due to the selective positioning of the balance plate and the resulting orientation of the glass former. The glass former is subsequently cooled to complete the tip forming process for the breathing tube.

Accordingly, after the tube shaping process is performed, the resulting breathing tube is shaped as depicted in FIGS. 3A-3C. For instance, the distal end 12*b* of the breathing tube 10*b* includes an outer surface 14*b* having a tapered or rounded portion 16*b* to facilitate smooth insertion of the tube into the trachea while preventing or limiting irritation and trauma to the patient. Moreover, the tip surface 18*b* at the distal end 12*b* of the tube is substantially perpendicular to a longitudinal axis 19*b* of the tube body which ensures uniformity of the adjacent tapered portion 16*b*.

While a holding jig for a glass former and a corresponding method of shaping a breathing tube have been described in terms of what may be considered to be specific aspects, the present invention is not limited to the disclosed aspects. Additional modifications and improvements to the holding jig and corresponding method of shaping a breathing may be apparent to those skilled in the art. Moreover, the many features and advantages of the disclosure are apparent from the detailed specification, and thus, it is intended by the appended claims to cover all such features and advantages of the present invention which fall within the spirit and scope of the disclosure. Further, it is not desired to limit the disclosure to the exact construction and operation illustrated and described, and accordingly, all suitable modifications and equivalents may be resorted to, falling within the scope of the disclosure. The present disclosure should therefore be considered as illustrative and not restrictive. As such, this disclosure is intended to cover various modifications and similar arrangements included within the spirit and scope of the claims, which should be accorded their broadest interpretation so as to encompass all such modifications and similar structures.

What is claimed is:

1. A holding jig for a breathing tube, the holding jig comprising:

a glass former including a proximal end configured to receive an end of the breathing tube, and an interior shaping cavity configured to shape the end of the breathing tube;

a balance plate including a distal balance surface configured to abut the proximal end of the glass former;

a base plate including a proximal base surface, a distal base surface defining a seat recess configured to receive the balance plate, and a tube hole configured to receive the breathing tube;

a grip plate configured to be releasably secured to the base plate, the grip plate including a grip hole sized to receive a portion of the glass former; and an adjustment plug operable to selectively position the balance plate within the seat recess to align a longitudinal axis of the glass former with a longitudinal axis of the tube hole of the base plate.

2. The holding jig according to claim 1, wherein a proximal end of the base plate includes a plug hole configured to receive the adjustment plug.

3. The holding jig according to claim 2, wherein the plug hole opens to an interior space of the seat recess of the base plate to permit moving the adjustment plug into the seat recess to abut a proximal balance surface of the balance plate.

4. The holding jig according to claim 2, wherein the adjustment plug is configured to prevent removal of the adjustment plug from the plug hole.

5. The holding jig according to claim 4, wherein the adjustment plug has a flexible arm that includes a flared wing configured to prevent removal of the adjustment plug from the plug hole.

6. The holding jig according to claim 2, wherein the proximal end of the base plate includes four plug holes annularly spaced apart for respectively receiving four adjustment plugs.

7. The holding jig according to claim 1, wherein the base plate includes a fastener hole extending through the base plate and configured to receive a fastener for releasably securing the base plate to the grip plate.

8. The holding jig according to claim 7, wherein the grip plate further comprises a lock hole corresponding to the fastener hole of the base plate, the lock hole configured to receive the fastener for releasably securing the base plate to the grip plate.

9. The holding jig according to claim 1, wherein the grip plate includes a proximal grip surface configured to abut the distal base surface of the base plate when receiving the glass former within the grip hole.

10. The holding jig according to claim 1, wherein the grip hole has a sloped inner surface configured to grip a sloped outer surface of the glass former.

11. The holding jig according to claim 1, wherein a diameter of the grip hole of the grip plate is equal to a maximum diameter of the glass former.

12. The holding jig according to claim 1, wherein the longitudinal axis of the glass former extends in a direction between the proximal end of the glass former and a distal end of the glass former.

13. The holding jig according to claim 1, wherein the interior shaping cavity of the glass former defines an inner surface configured to shape an outer surface of a distal end of the tube when the glass former is heated.

14. The holding jig according to claim 13, wherein a diameter of the interior shaping cavity decreases in size in a direction from the proximal end of the glass former toward a distal end of the glass former.

15. The holding jig according to claim 1, wherein a distal end of the glass former is closed and includes an elongated core protruding into the shaping cavity along the longitudinal axis of the glass former.

16. The holding jig according to claim 1, wherein the proximal end of the glass former includes a seating surface having an outwardly extending annular flange configured to stabilize the glass former against the distal balance surface of the balance plate.

17. The holding jig according to claim 1, wherein the balance plate comprises acetal resin.

18. The holding jig according to claim 1, wherein the breathing tube is a tracheostomy tube.

19. The holding jig according to claim 1, wherein the breathing tube is an endotracheal tube.

20. A method of shaping an end of a breathing tube, the method comprising:

providing the holding jig according to claim 1;

inserting the end of the breathing tube into the shaping cavity of the glass former;

moving the balance plate of the holding jig to a desired position within the seat recess of the base plate by manipulating the adjustment plug so that a longitudinal axis of the glass former substantially aligns with a longitudinal axis of the breathing tube;

heating the glass former for a set period of time; and shaping a distal end of the breathing tube such that an outer surface of the distal end of the breathing tube is tapered and a tip surface at the distal end of the breathing tube is substantially perpendicular to the longitudinal axis of the breathing tube.

* * * * *